(12) United States Patent
Sugibayashi

(10) Patent No.: US 10,178,263 B2
(45) Date of Patent: Jan. 8, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Yutaro Sugibayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/447,922

(22) Filed: Mar. 2, 2017

(65) Prior Publication Data

US 2018/0084132 A1 Mar. 22, 2018

(30) Foreign Application Priority Data

Sep. 16, 2016 (JP) .................................. 2016-182390

(51) Int. Cl.
*H04N 1/00* (2006.01)

(52) U.S. Cl.
CPC ..... *H04N 1/00973* (2013.01); *H04N 1/00204* (2013.01); *H04N 2201/0094* (2013.01)

(58) Field of Classification Search
CPC ........................ H04N 1/00973; H04N 1/00413
See application file for complete search history.

(56) References Cited

U.S. PATENT DOCUMENTS

| 5,267,727 | A  | * | 12/1993 | DeHority | ............... | G03G 15/50 209/556 |
| 8,854,649 | B2 | * | 10/2014 | Fujishita | ............ | H04N 1/00413 358/1.13 |
| 2008/0080921 | A1 | * | 4/2008 | Yasue | .................... | B41J 11/003 400/605 |
| 2013/0114100 | A1 | * | 5/2013 | Torii | .................... | G06F 11/0733 358/1.14 |
| 2014/0078549 | A1 | * | 3/2014 | Amiya | ............... | H04N 1/00233 358/1.15 |

FOREIGN PATENT DOCUMENTS

JP 2012-128437 A 7/2012

\* cited by examiner

*Primary Examiner* — Ibrahim Siddo
(74) *Attorney, Agent, or Firm* — Oliff PLC

(57) ABSTRACT

An information processing apparatus includes a setting-change-information receiver, a state-change-necessity-information memory, and a setting processor. The setting-change-information receiver receives setting-change information, which contains a setting item and a set value for the setting item, from a terminal device via a communication line. The state-change-necessity-information memory stores the setting item in association with state-change-necessity information indicating whether or not a physical state of the information processing apparatus has to be changed. The setting processor changes a setting of the information processing apparatus based on the setting-change information. The setting processor reserves changing of the set value for the setting item if the setting item contained in the setting-change information requires a change in the physical change.

8 Claims, 7 Drawing Sheets

| SETTING ITEM | STATE HAS TO BE CHANGED? | CURRENT SET VALUE | NOTIFICATION INFORMATION | STATE-CHANGE-COMPLETION CONDITION |
|---|---|---|---|---|
| SHEET TRAY 1 SIZE | YES | A4 | SIZE HAS TO BE CHANGED FROM {CURRENT SET VALUE} TO {CHANGED SET VALUE} | • NOTIFICATION INDICATING THAT CHANGING OF STATE IS COMPLETED IS PROVIDED |
| SHEET TRAY 1 COLOR | YES | WHITE | COLOR HAS TO BE CHANGED FROM {CURRENT SET VALUE} TO {CHANGED SET VALUE} | • NOTIFICATION INDICATING THAT CHANGING OF STATE IS COMPLETED IS PROVIDED |
| SHEET TRAY 1 PAPER QUALITY | YES | PLAIN PAPER | PAPER QUALITY HAS TO BE CHANGED FROM {CURRENT SET VALUE} TO {CHANGED SET VALUE} | • NOTIFICATION INDICATING THAT CHANGING OF STATE IS COMPLETED IS PROVIDED |
| SHEET TRAY 1 AUTOMATIC SELECTION PRIORITY LEVEL | NO | 1 | | |
| SOUND-LEVEL SETTING | YES | 3 | CHECK SOUND OF SHEET TRAY 1 FROM TERMINAL | • NOTIFICATION INDICATING THAT CHANGING OF STATE IS COMPLETED IS PROVIDED<br>• SOUND-LEVEL DETECTION VALUE IS WITHIN SOUND-LEVEL THRESHOLD VALUE AFTER CHANGE |
| INSTALLED POSITION | YES | TOKYO OFFICE | CHECK INSTALLED POSITION OF MULTIFUNCTION APPARATUS | • NOTIFICATION INDICATING THAT CHANGING OF STATE IS COMPLETED IS PROVIDED<br>• GPS OF MANAGER TERMINAL DETECTS POSITIONAL INFORMATION OF AREA AROUND TOKYO OFFICE |

FIG. 3

| SETTING ITEM | CHANGED SET VALUE | CURRENT SET VALUE |
|---|---|---|
| SHEET TRAY 1 SIZE | A5 | A4 |
| ... | ... | ... |

STATE OF APPARATUS HAS TO BE CHANGED
IN ORDER TO ENABLE FOLLOWING SETTING.
PLEASE CHANGE IN ACCORDANCE WITH
FOLLOWING GUIDANCE.

SHEET GUIDE

SHEET GUIDE

DETECTION VALUE OF DEVICE
• SHEET TRAY 1 SIZE: A4

RESERVED SET VALUE
• SHEET TRAY 1 SIZE: A5

CHANGE RESERVED SET VALUE

FOLLOWING SETTING HAS BEEN REFLECTED.

• SHEET TRAY 1 SIZE: A5

OK

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-182390 filed Sep. 16, 2016.

BACKGROUND

Technical Field

The present invention relates to information processing apparatuses, information processing methods, and non-transitory computer readable media.

SUMMARY

According to an aspect of the invention, there is provided an information processing apparatus including a setting-change-information receiver, a state-change-necessity-information memory, and a setting processor. The setting-change-information receiver receives setting-change information, which contains a setting item and a set value for the setting item, from a terminal device via a communication line. The state-change-necessity-information memory stores the setting item in association with state-change-necessity information indicating whether or not a physical state of the information processing apparatus has to be changed. The setting processor changes a setting of the information processing apparatus based on the setting-change information. The setting processor reserves changing of the set value for the setting item if the setting item contained in the setting-change information requires a change in the physical change.

BRIEF DESCRIPTION OF THE DRAWINGS

An exemplary embodiment of the present invention will be described in detail based on the following figures, wherein:

FIG. 2 schematically illustrates an example of a setting-item database;

FIG. 3 schematically illustrates an example of a reserve list;

FIG. 7 illustrates an example of a process guidance screen;

FIG. 8 illustrates an example of a reserved-set-value changing screen; and

FIG. 9 illustrates an example of a setting-completion screen.

DETAILED DESCRIPTION

An exemplary embodiment of the present invention will be described below with reference to the drawings.

Figure 1:
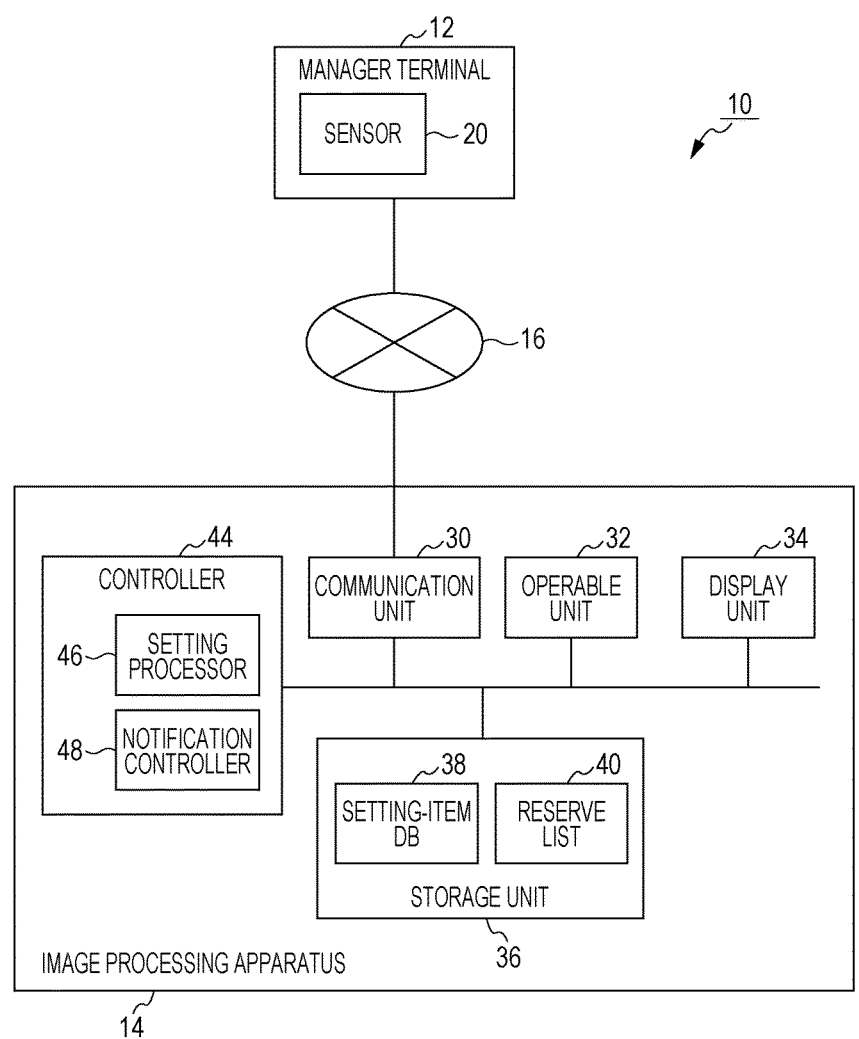
FIG. 1 schematically illustrates the configuration of an image processing system according to an exemplary embodiment.

FIG. 1 schematically illustrates the configuration of an image processing system 10 as an information processing system according to this exemplary embodiment. The image processing system 10 includes a manager terminal 12 and an image processing apparatus 14. The manager terminal 12 and the image processing apparatus 14 are connected to each other in a communicable manner via a communication line 16, such as a local area network (LAN) or the Internet.

The manager terminal 12 as a terminal device is used by a manager as a setter who configures the settings of the image processing apparatus 14. Although the manager terminal 12 may be, for example, a personal computer, the manager terminal 12 used in this exemplary embodiment is a portable terminal, such as a tablet terminal or a smartphone. The manager terminal 12 includes components included in a normal computer, such as a controller constituted of a central processing unit (CPU), a storage unit constituted of a hard disk, a read-only memory (ROM), or a random access memory (RAM), an input unit constituted of a mouse, a keyboard, or a touchscreen, a display unit constituted of a liquid crystal panel, and a communication unit constituted of a network adapter.

Furthermore, it is desirable that the manager terminal 12 be provided with a sensor 20. As will be described later, the sensor 20 detects a change in the physical state related to the image processing apparatus 14. For example, the sensor 20 includes a camera for imaging the physical state related to the image processing apparatus 14, a microphone for acquiring sound released by the image processing apparatus 14, or a global-positioning-system (GPS) sensor that detects the position of the manager terminal 12. A detection value obtained by the sensor 20 is transmitted to the image processing apparatus 14.

The manager terminal 12 is used for generating setting-change information for changing the settings (software settings) of the image processing apparatus 14, and is also used for transmitting the setting-change information to the image processing apparatus 14. The setting-change information transmitted from the manager terminal 12 to the image processing apparatus 14 contains one or more setting items and a set value for each setting item.

In this exemplary embodiment, the image processing apparatus 14 as an information processing apparatus is a multifunction apparatus having, for example, a printing function, a copying function, a scanning function, and a facsimile function. The image processing apparatus 14 operates by causing an authenticating unit (not shown) to authenticate a manager or user and receiving an operation from the authenticated manager or user. The information processing apparatus is not limited to the image processing apparatus 14 and may be, for example, a personal computer, a tablet terminal, an image forming apparatus, or another apparatus, so long as the settings of the apparatus are changed by receiving the setting-change information from the manager terminal 12. Units included in the image processing apparatus 14 will be described below.

A communication unit 30 is constituted of, for example, a network adapter. The communication unit 30 is used for communicating with the manager terminal 12 via the communication line 16. Specifically, the communication unit 30 receives, from the manager terminal 12, the setting-change information for changing the settings of the image processing apparatus 14. In other words, the communication unit 30 also functions as a setting-change-information receiving unit. Alternatively, the communication unit 30 transmits various types of information to the manager terminal 12.

An operable unit 32 includes, for example, a touchscreen or buttons. The operable unit 32 is used for inputting a command from the manager or the user of the image processing apparatus 14 to the image processing apparatus 14.

A display unit 34 is constituted of, for example, a liquid crystal panel. The display unit 34 displays various types of information related to the image processing apparatus 14.

A storage unit 36 is constituted of, for example, a hard disk, a ROM, or a RAM. The storage unit 36 stores a program for causing the units in the image processing apparatus 14 to function. As shown in FIG. 1, a setting-item database (DB) 38 and a reserve list 40 are stored in the storage unit 36.

In the setting-item DB 38, multiple setting items related to the image processing apparatus 14 are each stored in association with state-change-necessity information indicating whether or not the physical state related to the image processing apparatus 14 has to be changed when the setting of the setting item is changed. In other words, the storage unit 36 functions as a state-change-necessity-information storage unit. The expression "the physical state related to the image processing apparatus 14 is changed" implies that the physical state related to the image processing apparatus 14 is changed so that it accords with a set value changed in accordance with the setting-change information.

The physical state related to the image processing apparatus 14 includes, for example, the state of sheets placed on each sheet tray included in the image processing apparatus 14 (such as the type, size, color, paper quality, amount, and position), the state of sound output from the image processing apparatus 14 (such as the sound level), or the location where the image processing apparatus 14 is installed.

FIG. 2 illustrates an example of the setting-item DB 38. As shown in FIG. 2, in this exemplary embodiment, the setting-item DB 38 is in the form of a table in which a setting item and state-change-necessity information are associated with each other in each record. For example, referring to the uppermost record, the state-change-necessity information "yes" is associated with the setting item "sheet tray 1: size". This implies that, when changing the set value for the setting item "sheet tray 1: size", the physical state related to the image processing apparatus 14 has to be changed. On the other hand, the state-change-necessity information "no" is associated with the setting item "sheet tray 1: automatic selection priority level". This implies that, when changing the set value for the setting item "sheet tray 1: automatic selection priority level", the physical state related to the image processing apparatus 14 does not have to be changed.

It is desirable that a current set value be associated with each setting item in the setting-item DB 38. For example, as shown in FIG. 2, the current set value "A4" may be associated with the setting item "sheet tray 1: size".

Furthermore, it is desirable that, in the setting-item DB 38, notification information indicating notification contents to be provided to the manager when a set value for a setting item with "yes" as the state-change-necessity information is changed may be associated with the setting item. For example, as shown in FIG. 2, the message "size has to be changed from {current set value} to {changed set value}" may be associated with the setting item "sheet tray 1: size".

Furthermore, it is desirable that, in the setting-item DB 38, a state-change-completion condition for regarding that changing of the physical state related to a setting item with "yes" as the state-change-necessity information has been completed may be associated with the setting item. For example, as shown in FIG. 2, the message "notification indicating that changing of state is completed is provided" is added as the state-change-completion condition to the setting item "sheet tray 1: size". This indicates that, in a case where the condition in which the manager notifies that that the changing of the physical state has been completed is satisfied, it is determined that the size of sheets placed on the sheet tray 1 has been completely changed.

As will be described later, in a case where a setting item included in the setting-change information received from the manager terminal 12 is associated with the state-change-necessity information "yes" in the setting-item DB 38, the set value for the setting item is temporarily reserved in the image processing apparatus 14. In this case, the setting item that has caused the changing of the set value to be reserved and the set value therefor are stored in association with each other in the reserve list 40.

FIG. 3 illustrates an example of the reserve list 40. As shown in FIG. 3, in this exemplary embodiment, the reserve list 40 is also in the form of a table. Every time the changing of a set value for a setting item is reserved, a record with the setting item and the set value (i.e., changed set value) associated with each other is added to the reserve list 40. For example, in a case where the setting-change information received from the manager terminal 12 contains the setting item "sheet tray 1: size" and the set value "A5", when the changing of the set value is reserved, the setting item "sheet tray 1: size" and the changed set value "A5" are stored in association with each other into the reserve list 40, as shown in FIG. 3.

It is desirable that a current set value of a setting item be associated with the setting item in the reserve list 40. In the example in FIG. 3, the current set value "A4" is stored in association with the setting item "sheet tray 1: size".

A controller 44 is constituted of, for example, a CPU or a microcontroller. The controller 44 controls each unit of the image processing apparatus 14 in accordance with the program stored in the storage unit 36. The controller 44 also functions as a setting processor 46 and a notification controller 48 in accordance with the program.

The setting processor 46 performs a process for changing a set value for each type of setting item of the image processing apparatus 14 based on the setting-change information received from the manager terminal 12.

Furthermore, in a case where a setting item contained in the setting-change information received from the manager terminal 12 is associated with the state-change-necessity information "yes" in the setting-item DB 38, the setting processor 46 temporarily reserves the changing of a set value for the setting item. In contrast, if the setting item contained in the setting-change information received from the manager terminal 12 is associated with the state-change-necessity information "no" in the setting-item DB 38, the setting processor 46 immediately changes the set value for the setting item.

In the case where the changing of the set value for the setting item contained in the setting-change information is temporarily reserved, the setting processor 46 stores the setting item and a changed set value contained in the setting-change information in association with each other into the reserve list 40.

After temporarily reserving the changing of the set value for the setting item, the setting processor 46 performs a process for changing the set value for the setting item to the reserved value if the setting processor 46 determines that the physical state related to the image processing apparatus 14 has been changed to match the set value, which is planned to be changed, for the setting item. In this exemplary embodiment, in a case where the state-change-completion condition associated with the setting item for which the changing of the set value is reserved is satisfied in the setting-item DB 38, the setting processor 46 determines that the physical state related to the image processing apparatus 14 has been changed in accordance with the setting item, and changes the set value for the setting item to the reserved value. For example, in the state where the contents in FIG. 2 are stored in the setting-item DB 38, if the setting-change information received from the manager terminal 12 contains the set value "A5", which is planned to be changed, for the setting item "sheet tray 1: size", the changing of the set value is temporarily reserved. Subsequently, when state-change-completion notification is received from the manager, the setting processor 46 executes a process for changing to the reserved set value. In other words, the set value for the setting item "sheet tray 1: size" is changed to "A5".

For example, the state-change-completion notification is input to the image processing apparatus 14 by the manager pressing a "state-change-completion" button included in the operable unit 32 or by the image processing apparatus 14 receiving a state-change-completion command from the manager terminal 12 as a result of the manager pressing a state-change-completion button included in the input unit of the manager terminal 12.

Furthermore, in addition to the state-change-completion notification, the state-change-completion condition may include various conditions so long as it is determinable that the physical state related to the image processing apparatus 14 has been changed.

For example, an image of the physical state related to the image processing apparatus 14 may be acquired by using the camera in the manager terminal 12, and the analysis result of the acquired image may be set as the state-change-completion condition. For example, the image processing apparatus 14 may analyze an acquired image of a sheet tray having sheets placed thereon, and if it is detected that sheets having the size designated by a changed set value are placed on the sheet tray, it may be determined that the state-change-completion condition is satisfied. In this case, the image acquired by the manager terminal 12 may be transmitted to an image analyzing server, and the image processing apparatus 14 may acquire only the analysis result from the image analyzing server. Even in the case where the state-change-completion notification from the manager is set as the state-change-completion condition, the image acquired by the camera in the manager terminal 12 may be used as an evidence for proving that the state changing process has been definitely completed.

Furthermore, with regard to the setting item "sound-level setting", the level of sound acquired by the microphone in the manager terminal 12 may be set as the state-change-completion condition. For example, in a case where setting-change information containing the changed set value "3" for the setting item "sound-level setting" is received, if the level of sound acquired by the microphone in the manager terminal 12 is within a sound-level threshold value desired by the manager, it may be determined that the state-change-completion condition is satisfied.

With regard to the setting item "installed position", positional information acquired by the GPS sensor in the manager terminal 12 may be set as the state-change-completion condition. For example, in a case where setting-change information containing the changed set value "Yokohama office" for the setting item "installed position" is received, if the positional information acquired by the GPS sensor in the manager terminal 12 indicates a predetermined range centered on the Yokohama office, the manager may move to the front of the image processing apparatus 14 installed in the Yokohama office and confirm that the image processing apparatus 14 is definitely installed in the Yokohama office. Therefore, in the case where the positional information acquired by the GPS sensor in the manager terminal 12 is within the predetermined range of the position indicated by the changed set value, it may be determined that the state-change-completion condition is satisfied.

The notification controller 48 performs control for providing various kinds of notification to the manager. In this exemplary embodiment, the notification controller 48 provides notification to the manager by displaying various types of screens on the display unit 34 or the display unit of the manager terminal 12. The notification controller 48 transmits display control information to the manager terminal 12 via the communication unit 30 so as to cause the display unit of the manager terminal 12 to display the various types of screens. The method of notification by the notification controller 48 may involve causing a sound output unit (not shown) in the image processing apparatus 14 or the manager terminal 12 to output sound, in addition to causing, for example, the display unit 34 to display a screen.

Specifically, in a case where a setting item contained in the setting-change information received from the manager terminal 12 is associated with the state-change-necessity information "yes" in the setting-item DB 38, the notification controller 48 performs control for displaying a screen for notifying the manager that the physical state related to the image processing apparatus 14 has to be changed in accordance with the setting item.

In this exemplary embodiment, if a setting item contained in the setting-change information received from the manager terminal 12 is associated with the state-change-necessity information "yes" in the setting-item DB 38, the notification controller 48 causes the display unit 34 or the display unit of the manager terminal 12 to display notification information associated with the setting item in the setting-item DB 38. For example, in a state where the current set value for the setting item "sheet tray 1: size" is "A4", if setting-change information containing the setting item "sheet tray 1: size" and the changed set value "A5" is received by the image processing apparatus 14, the notification controller 48 performs a process for displaying the message "sheets placed on sheet tray 1 have to be changed from A4 to A5".

In addition to displaying the above message, the notification controller 48 may cause the display unit 34 or the display unit of the manager terminal 12 to display process guidance for guiding the process for changing the physical state related to the image processing apparatus 14. For example, in a case where the setting item is "sheet tray 1: size", a guidance image showing the position of the sheet tray 1 or the procedure for replacing the sheets on the sheet tray 1 may be displayed. The guidance image may be a still image, or a guidance animation may be displayed for making the process easier to understand. Furthermore, the guidance image may be displayed by using augmented reality (AR) in cooperation with the camera included in the sensor 20 of the manager terminal 12. For example, when guiding a process for replacing the sheets on the sheet tray 1, an image of the sheet tray 1 may be captured by the camera and a computer graphics (CG) image showing the procedure for replacing the sheets on the sheet tray 1 may be superposed on the image acquired by the camera and displayed on the display unit of the manager terminal 12.

Furthermore, prior to receiving the setting-change information from the manager terminal 12, the notification controller 48 may cause the display unit of the manager terminal 12 to display a screen for notifying the manager of a setting item that may require a change in the physical state related to the image processing apparatus 14 based on the setting-item DB 38.

Figure 4:
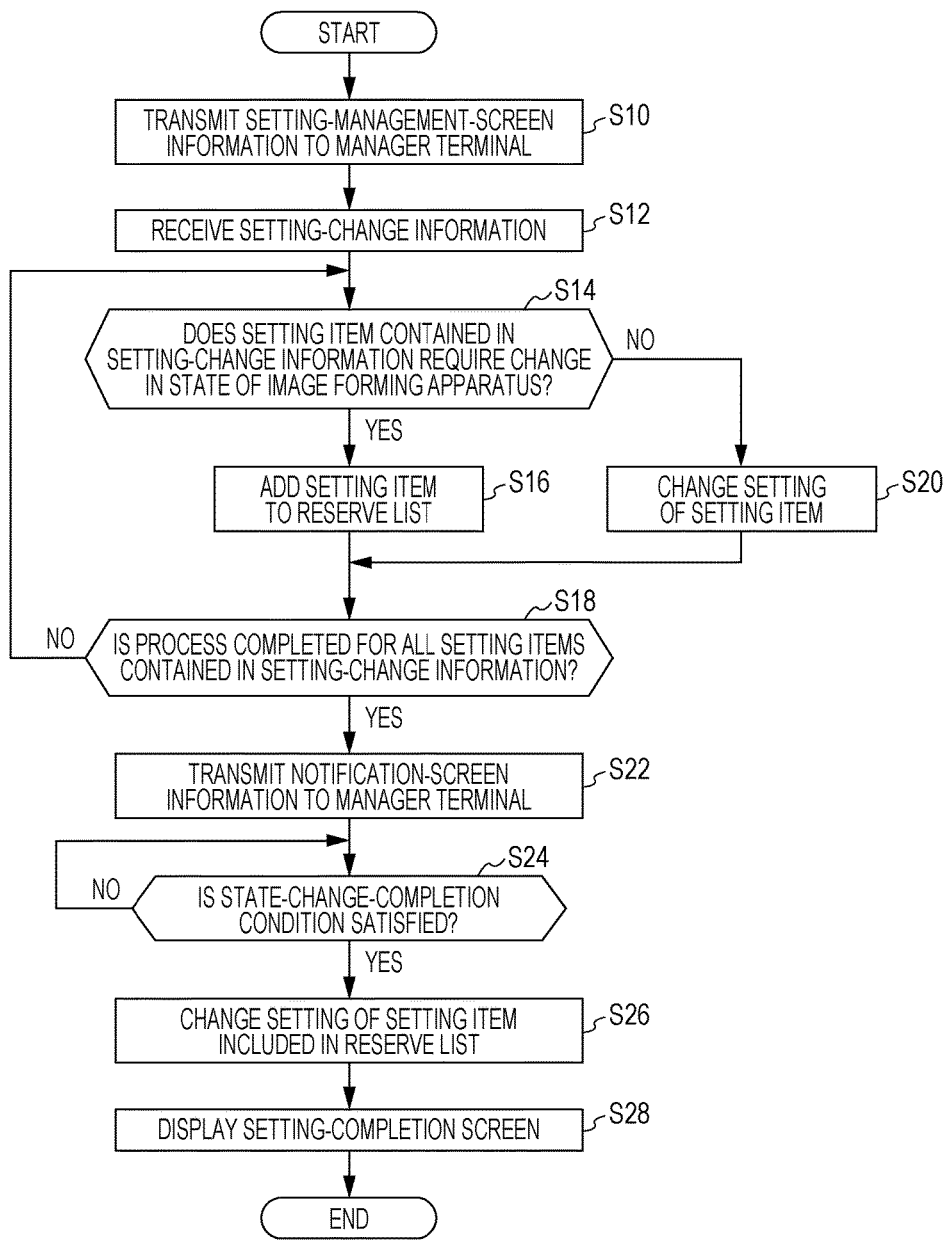
FIG. 4 is a flowchart illustrating the flow of a process in this exemplary embodiment.

The schematic configuration of the image processing system 10 is as follows. The flow of a process in this exemplary embodiment will be described below in accordance with a flowchart in FIG. 4 while referring to FIG. 1. It is assumed that the contents shown in FIG. 2 are stored in the setting-item DB 38 at the time when the flowchart in FIG. 4 commences.

In step S10, when the image processing apparatus 14 receives access from the manager terminal 12, the notification controller 48 transmits setting-management-screen information to the manager terminal 12 so as to cause the display unit of the manager terminal 12 to display a setting management screen used for configuring the settings of the image processing apparatus 14. The notification controller 48 refers to the setting-item DB 38 so as to transmit, together with the setting-management-screen information, information indicating a setting item with the state-change-necessity information "yes" to the manager terminal 12.

Figure 5:
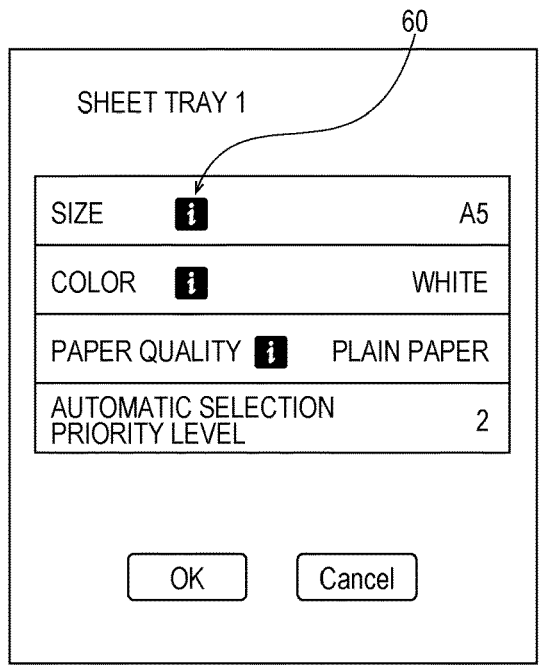
FIG. 5 illustrates an example of a setting management screen.

Accordingly, the setting management screen is displayed on the display unit of the manager terminal 12. FIG. 5 illustrates an example of the setting management screen. As shown in FIG. 5, in the setting management screen, a set value for each setting item may be input by the manager. Moreover, in the setting management screen, an icon 60 is added to each setting item that may require a change in the physical state related to the image processing apparatus 14 in correspondence with changing of the corresponding set value. In the example in FIG. 5, the setting items "sheet tray 1: size", "sheet tray 1: color", and "sheet tray 1: paper quality" are given the icons 60. With the icons 60, the manager may ascertain the setting items that may require a change in the physical state related to the image processing apparatus 14 before changing the settings. When the manager inputs a set value for each setting item and touches an OK button on the setting management screen, setting-change information is transmitted from the manager terminal 12 to the image processing apparatus 14.

In step S12, the image processing apparatus 14 receives the setting-change information. In this case, the setting-change information contains the changed set value "A5" for the setting item "sheet tray 1: size" and the changed set value "2" for the setting item "sheet tray 1: automatic selection priority level".

In step S14, the setting processor 46 determines whether or not each of the setting items contained in the received setting-change information is associated with the state-change-necessity information "yes" in the setting-item DB 38. In this case, it is assumed that the determination is performed with respect to the setting item "sheet tray 1: size". Since the setting item "sheet tray 1: size" is associated with the state-change-necessity information "yes" in the setting-item DB 38 (see FIG. 2), the process proceeds to step S16.

In step S16, the setting processor 46 temporarily reserves the changing of the set value for the setting item determined in step S14. Then, the setting item and the changed set value for the setting item are associated with each other and are added to the reserve list 40. As shown in FIG. 3, the setting item "sheet tray 1: size", the changed set value "A5", and the current set value "A4" for the setting item "sheet tray 1: size" are associated with one another and are added to the reserve list 40.

In step S18, the setting processor 46 determines whether or not the process from step S14 and above is completed for all of the setting items contained in the setting-change information received in step S12. In this case, since the process for the setting item "sheet tray 1: automatic selection priority level" is not completed yet, the process returns to step S14.

In step S14 performed again, the setting processor 46 performs the determination with respect to the setting item "sheet tray 1: automatic selection priority level". Since the setting item "sheet tray 1: automatic selection priority level" is associated with the state-change-necessity information "no" in the setting-item DB 38 (see FIG. 2), the process proceeds to step S20.

In step S20, the setting processor 46 changes the set value for the setting item in accordance with the setting-change information. In this case, the set value for the setting item "sheet tray 1: automatic selection priority level" is changed to "2".

In step S18 performed again, the setting processor 46 determines that the process from step S14 and above is completed for all of the setting items contained in the setting-change information received in step S12. The process then proceeds to step S22.

Figure 6:
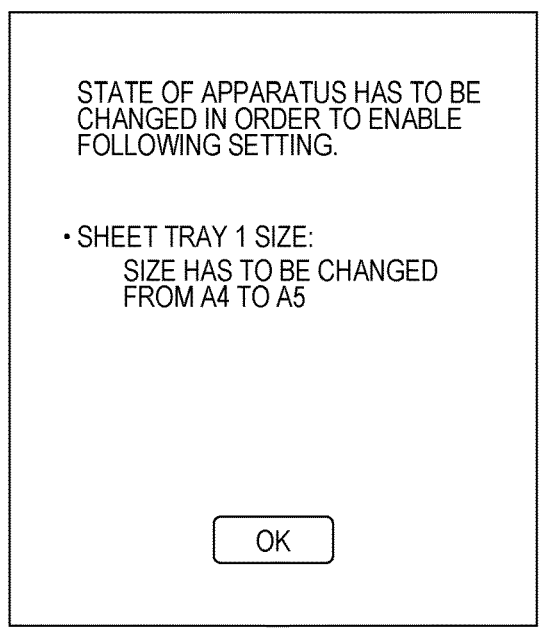
FIG. 6 illustrates an example of a notification screen.

In step S22, the notification controller 48 causes the display unit of the manager terminal 12 to display a notification screen for notifying the manager that the physical state related to the image processing apparatus 14 has to be changed in correspondence with the change in the set value for the setting item added to the reserve list 40. FIG. 6 illustrates an example of the notification screen. The notification screen includes, for example, the setting item added to the reserve list 40 (i.e., the setting item "sheet tray 1: size" in this example) and notification information associated with the setting item in the setting-item DB 38 (i.e., the message "size has to be changed from A4 to A5"). If the reserve list 40 includes multiple setting items, the notification is performed for each setting item on the notification screen. By using the notification screen, the manager may be prompted to change the physical state, where appropriate.

Furthermore, the notification controller 48 causes the display unit 34 of the image processing apparatus 14 to display a process guidance screen for guiding the process for changing the physical state related to the image processing apparatus 14 in accordance with the setting item added to the reserve list 40. FIG. 7 illustrates an example of the process guidance screen. By using the process guidance screen, the manager may ascertain how to perform the process for changing the physical state, which has to be changed in correspondence with the changing of the setting.

Moreover, the notification controller 48 may cause the display unit 34 to display a reserved-set-value changing screen used for changing a changed set value (i.e., reserved set value) for the setting item added to the reserve list 40. FIG. 8 illustrates an example of the reserved-set-value changing screen. By using the reserved-set-value changing screen, the reserved set value is changeable. For example, when the manager makes a command for changing a set value once but the physical state related to the image processing apparatus 14 has to be changed in correspondence with the changing of the set value, if the manager desires to cancel the changing of the set value, the manager may use the reserved-set-value changing screen to reset the reserved set value to the current set value.

The notification controller 48 may cause the display unit 34 to display the notification screen, the process guidance screen, or the reserved-set-value changing screen when the notification controller 48 detects that the manager is approaching the image processing apparatus 14. For example, the approaching of the manager toward the image processing apparatus 14 is detected when near-field communication devices (such as Bluetooth (registered trademark)) provided in the manager terminal 12 and the image processing apparatus 14 become communicable with each other or when the manager is authenticated by (i.e., logs into) the image processing apparatus 14.

In step S24, the setting processor 46 determines whether or not the physical state of the image processing apparatus 14 corresponding to the setting item added to the reserve list 40 is changed. In this exemplary embodiment, the setting processor 46 determines whether or not the state-change-completion condition associated with the reserved setting item (i.e., the setting item added to the reserve list 40) in the setting-item DB 38 is satisfied. In this case, the setting processor 46 determines whether or not the state-change-completion condition "notification indicating that changing of state is completed is provided" associated with the setting item "sheet tray 1: size" included in the reserve list 40 is satisfied. If the condition is satisfied, the process proceeds to step S26. If the state-change-completion condition is not satisfied, the setting processor 46 waits until the state-change-completion condition is satisfied. If the state-change-completion condition is not satisfied even after waiting for a predetermined time period, the process ends without changing the set value for the setting item.

In step S26, the setting processor 46 changes the set value for the setting item added to the reserve list 40. In this case, the set value for the setting item "sheet tray 1: size" is changed to "A5". In addition, the setting processor 46 deletes the record related to this setting item from the reserve list 40.

In step S28, the notification controller 48 causes the display unit 34 to display a setting-completion screen for notifying the manager that the changing of the set value for the temporarily-reserved setting item is completed. FIG. 9 illustrates an example of the setting-completion screen.

According to this exemplary embodiment described above, with regard to a setting item that may require a change in the physical state related to the image processing apparatus 14 in correspondence with changing of a set value, even if there is a command from the manager for changing the set value for the setting item, the changing of the set value is temporarily reserved. Then, after it is determined that the physical state related to the image processing apparatus 14 is properly changed, the process for changing the set value is executed. Accordingly, a mismatch between the settings and the physical state of the image processing apparatus 14 may be prevented.

Although the exemplary embodiment of the present invention has been described above, the exemplary embodiment of the present invention is not limited to that described above and permits various modifications so long as they do not depart from the scope of the invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a setting-change-information receiver that receives setting-change information from a terminal device via a communication line, the setting-change information containing a setting item and a set value for the setting item;
a state-change-necessity-information memory that stores the setting item in association with state-change-necessity information indicating whether or not a physical state related to the information processing apparatus has to be changed; and
a setting processor that changes a setting of the information processing apparatus based on the setting-change information, the setting processor reserving changing of the set value for the setting item by storing a changed set value for the setting item in a reserve list table if the setting item contained in the setting-change information requires a change in the physical state, and
the setting processor subsequently changing the set value to the changed set value for the setting item based at least in part on a signal from a sensor associated with the terminal device indicating the sensor detected that the physical state is changed to match the changed set value for the setting item.

2. The information processing apparatus according to claim 1,
wherein the setting processor reserves the changing of the set value for the setting item and subsequently changes the set value to the changed set value for the setting item if the setting processor determines that the physical state is changed to match the changed set value for the setting item.

3. The information processing apparatus according to claim 2,
wherein the setting processor determines that the physical state is changed if a state-change-completion condition is satisfied, the state-change-completion condition including a setter notifying the information processing apparatus that changing of the physical state is completed and the information processing apparatus receiving the signal from the sensor indicating the sensor detected that the physical state is changed to match the changed set value for the setting item.

4. The information processing apparatus according to claim 1, further comprising:
a notification controller that notifies a setter that the physical state has to be changed in a case where the physical state has to be changed.

5. The information processing apparatus according to claim 4,
wherein the notification controller provides the notification together with process guidance for guiding a process for changing the physical state.

6. The information processing apparatus according to claim 4,
wherein, before the setting-change-information receiver receives the setting-change information, the notification controller notifies the setter of the setting item that requires a change in the physical state.

7. A non-transitory computer readable medium storing a program causing a computer to execute a process for processing information, the process comprising:

receiving setting-change information from a terminal device via a communication line, the setting-change information containing a setting item and a set value for the setting item;

storing the setting item in association with state-change-necessity information indicating whether or not a physical state related to an information processing apparatus has to be changed;

reserving changing of the set value for the setting item by storing a changed set value for the setting item in a reserve list table if the setting item contained in the setting-change information requires a change in the physical state, receiving a signal from a sensor associated with the terminal device that indicating the sensor detected the physical state is changed to match the changed set value for the setting item; and subsequently changing the set value to the changed set value for the setting item based at least in part on the received signal from the sensor.

8. An information processing method comprising:

receiving setting-change information from a terminal device via a communication line, the setting-change information containing a setting item and a set value for the setting item;

storing the setting item in association with state-change-necessity information indicating whether or not a physical state related to an information processing apparatus has to be changed;

reserving changing of the set value for the setting item by storing a changed set value for the setting item in a reserve list table if the setting item contained in the setting-change information requires a change in the physical state, receiving a signal from a sensor associated with the terminal device that indicating the sensor detected the physical state is changed to match the changed set value for the setting item; and subsequently changing the set value to the changed set value for the setting item based at least in part on the received signal from the sensor.

* * * * *